United States Patent
Gutzeit et al.

(10) Patent No.: US 11,281,238 B2
(45) Date of Patent: Mar. 22, 2022

(54) HYDRAULIC CONTROL UNIT FOR AN AUTOMATIC TRANSMISSION OF A MOTOR VEHICLE

(71) Applicant: ZF Friedrichshafen AG, Friedrichshafen (DE)

(72) Inventors: Marcel Gutzeit, Meckenbeuren (DE); Thilo Schmidt, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/832,343

(22) Filed: Mar. 27, 2020

(65) Prior Publication Data
US 2020/0309165 A1 Oct. 1, 2020

(30) Foreign Application Priority Data
Mar. 29, 2019 (DE) .................. 10 2019 204 510.3

(51) Int. Cl.
*G05D 7/01* (2006.01)
*F15B 15/20* (2006.01)
*F16H 61/02* (2006.01)
*F15B 13/04* (2006.01)

(52) U.S. Cl.
CPC ......... *G05D 7/0133* (2013.01); *F15B 15/202* (2013.01); *F16H 61/0206* (2013.01); *G05D 7/014* (2013.01); *F15B 13/0402* (2013.01); *F15B 2211/422* (2013.01)

(58) Field of Classification Search
CPC . F16K 11/0716; F16K 31/0668; G05D 7/014; Y10T 137/8671
See application file for complete search history.

(56) References Cited

U.S. PATENT DOCUMENTS

| | | | | |
|---|---|---|---|---|
| 3,472,274 A * | 10/1969 | Fettke | ..................... | F16K 17/04 137/469 |
| 3,626,474 A * | 12/1971 | Hammer | ................. | F16K 47/00 137/554 |
| 4,085,775 A * | 4/1978 | Steele, Jr. | ............ | F16K 11/044 137/625.27 |
| 6,189,562 B1 * | 2/2001 | Lorentz | ................... | F16K 17/04 137/469 |
| 6,358,181 B1 * | 3/2002 | Friedmann | ............ | F16H 61/662 477/37 |
| 2014/0264133 A1 * | 9/2014 | Johnson | .................. | F16K 15/06 251/356 |
| 2017/0261118 A1 * | 9/2017 | Sobieszek | ........... | F16K 31/1221 |

* cited by examiner

*Primary Examiner* — Reinaldo Sanchez-Medina
*Assistant Examiner* — Nicole Gardner
(74) *Attorney, Agent, or Firm* — Dority & Manning, P.A.

(57) ABSTRACT

A hydraulic control unit (4) includes a valve bush (12), a valve cover (15) partially closing the valve bush (12) on an end face (S1), a valve slide (13) guided in a longitudinal direction (L) within the valve bush (12), and a housing part (6). The housing part (6) includes a recess (8) matching an external contour of the valve bush (12). An intermediate plate (7) is configured to partially cover the valve cover (15). A spring (14) is arranged within the valve bush (12) and preloads the valve slide (13) in a starting position. The valve bush (12) is inserted, together with the valve cover (15), the valve slide (13), and the spring (14), into the recess (8) of the housing part (6) and jointly form a hydraulic valve (9). The valve bush (12) forms an inlet (19), and the valve cover (15) forms an outlet (31).

15 Claims, 5 Drawing Sheets

HYDRAULIC CONTROL UNIT FOR AN AUTOMATIC TRANSMISSION OF A MOTOR VEHICLE

CROSS-REFERENCE TO RELATED APPLICATION

The present application is related and has right of priority to German Patent Application No. 10 2019 204 510.3 filed on Mar. 29, 2019, which is incorporated by reference in its entirety for all purposes.

FIELD OF THE INVENTION

The invention relates generally to a hydraulic control unit for an automatic transmission of a motor vehicle. The invention also relates generally to an automatic transmission that includes the hydraulic control unit as well as to a motor vehicle that includes the automatic transmission.

BACKGROUND

Hydraulic control units for automatic transmissions of motor vehicles can include different hydraulic valves, which carry out different functions within the hydraulic control unit, for example, volumetric flow rate control valves, pressure control valves, and pressure reduction valves. These hydraulic valves are typically designed as separate components and are connected to a port of a duct plate or a valve plate of the hydraulic control unit. This requires a separate port and installation space for the particular hydraulic valve. In addition, each hydraulic valve must be connected, on the one hand, to the duct plate and, on the other hand, to another element of the hydraulic control unit.

SUMMARY OF THE INVENTION

Example aspects of the present invention provide a hydraulic control unit, which requires little installation space and can be manufactured using little assembly effort.

According to a first example aspect of the invention, a hydraulic control unit for an automatic transmission of a motor vehicle is made available. The hydraulic control unit includes a valve bush, a valve cover, which partially closes the valve bush on an end face, and a valve slide, which is guided in the longitudinal direction within the valve bush. In addition, the hydraulic control unit includes a housing part with a recess matching the external contour of the valve bush. In addition, an intermediate plate can be provided, which partially covers the valve cover and forms a counter support for the valve cover. Moreover, the hydraulic control unit includes a spring, arranged within the valve bush, for preloading the valve slide in a starting position.

The housing part can be, in particular, a duct plate or a valve plate. A "duct plate" is understood to be an element of the hydraulic control unit, which includes multiple ducts for conducting hydraulic fluid, in particular oil. The duct plate can be, for example, a casting. The valve plate can also be a casting. The valve plate can be configured, for example, for accommodating valves of the hydraulic control unit or providing ports for the valves. The hydraulic control unit can include the duct plate as well as the valve plate, wherein the intermediate plate can separate the duct plate from the valve plate. In the following, example aspects of the invention are described largely in conjunction with a duct plate, wherein the comments apply similarly for other housing parts of the hydraulic control unit, in particular for the valve plate.

According to example aspects of the present invention, it is provided that the valve bush is inserted, together with the valve cover, the valve slide, and the spring, into the recess of the housing part, in particular of the duct plate, and forms a hydraulic valve. The valve bush can form an inlet for hydraulic fluid into the hydraulic valve, and the valve cover can form an outlet for hydraulic fluid out of the hydraulic valve. In addition, the housing part can form a duct for feeding hydraulic fluid to the inlet in the valve bush, and the intermediate plate can form a duct for discharging hydraulic fluid out of the outlet of the valve cover.

The hydraulic valve formed by the valve bush, the valve cover, the valve slide, and the spring can be installed and/or mounted, as a "insert part", into the hydraulic control unit. The mounting can take place in such a way that no additional complexity arises in handling processes because a number of insert parts (for example, strainers, check valves; balls), which are located in the valve plate or in the duct plate, are usually located in hydraulic control units anyway. According to example aspects of the present invention, the hydraulic valve is designed in such a way that the hydraulic valve can be mounted and/or inserted into the duct plate or valve plate of the hydraulic control unit in the simplest way during assembly, in particular without the need for complex centering or hold-down devices.

The recess can be designed as a stepped bore including two bore steps. The two bore steps can be designed to match two valve collars of the valve bush, wherein bore lengths of the two bore steps are matched to each other, so that the valve bush can be inserted into the stepped bore in such a way that, initially, only the valve collar having the greater outer diameter comes into contact with the stepped bore. In other words, step lengths of a stepped bore are selected in such a way that an upper larger collar of the valve bush can be inserted into an existing valve seat having a certain dimension, without a lower smaller collar coming into contact with the bore. The larger collar is guided already before the smaller collar is inserted. This facilitates the assembly. In particular, a thread is not necessary.

The feature "designed to match" can be understood to mean, in this context, that an inner diameter of the first bore step is matched to an outer diameter of the first valve collar in such a way that the first valve collar can be inserted into the first bore step. Under consideration of tolerances, the inner diameter of the first bore step can correspond, for example, to the outer diameter of the first valve collar. Correspondingly, an inner diameter of the second bore step is matched to an outer diameter of the second valve collar in such a way that the second valve collar can be inserted into the second bore step. Under consideration of tolerances, the inner diameter of the second bore step can correspond, for example, to the outer diameter of the second valve collar.

The aforementioned inner diameters of the two bore steps and the outer diameters of the two valve collars extend in a radial direction of the hydraulic valve. In an axial direction and/or in a longitudinal direction of the hydraulic valve, the first bore step has a first bore length and the second bore step has a second bore length. These two bore lengths of the two bore steps can be matched to each other in such a way that the valve bush can be inserted into the stepped bore in such a way that, initially, only the valve collar having the greatest outer diameter comes into contact with the stepped bore, in particular with its first bore step.

The first outer diameter of the first valve collar can be greater than the second outer diameter of the second valve collar. Correspondingly, the first inner diameter of the first bore step can be greater than the second inner diameter of the second bore step. The second bore step can be, in particular, the bore step that extends farther into the duct plate than the first bore step. In other words, the second bore step is located exclusively within the duct plate, whereas the first bore step is connected to a surface of the duct plate. Therefore, the valve bush can be inserted into the duct plate through the first bore step. Initially, the thinner second valve collar can be inserted into the wider first bore step. If the wider first valve collar is inserted into the wider first bore step, the first valve collar is guided through the first bore step, wherein the second valve collar initially does not yet plunge into the second bore step, but rather is still located within the first bore step. However, due to the guidance of the first valve collar through the first bore step, the second valve collar is simultaneously brought into the correct position, in order to be subsequently inserted into the second bore step.

The hydraulic valve can be a volumetric flow rate control valve or a pressure control valve or a pressure reduction valve. A kit can be made available, which makes it possible to provide different valve functions within the hydraulic control unit with the aid of multiple identical parts. In particular, the aforementioned valve types can be implemented by way of the valve slide being appropriately adapted to the particular function. The recess and/or the valve seat bore in the duct plate can be the same in all three variants. The casting and/or the ducts within the duct plate for feeding and discharging hydraulic fluid to and from the hydraulic valve can be suitably adapted to the requirements of the particular valve type. In particular, the three aforementioned valve types can be implemented by varying the valve slide and connecting the hydraulic valve in the hydraulic control unit.

In this sense, in one example embodiment, the hydraulic valve is made available, in a first alternative, as a volumetric flow rate control valve and, in a second alternative, as a pressure control valve while retaining the design of the valve bush and the recess in the duct plate and by varying the valve slide and the duct for feeding hydraulic fluid.

In the first alternative, the valve slide of the volumetric flow rate control valve can include an orifice or a throttle in the interior of the valve slide. The orifice or the throttle can be connected to the inlet and to the outlet of the volumetric flow rate control valve if the valve slide is located in a control position. Hydraulic fluid can then be fed to the inlet of the volumetric flow rate control valve and can flow through the orifice or throttle in such a way that the pressure is reduced and a constant flow is output via the outlet. The valve slide can be preloaded in the control position with the aid of a spring, which induces a restoring force. The hydraulic fluid fed to the volumetric flow rate control valve via the inlet of the volumetric flow rate control valve can act on a hydraulically effective surface of the valve slide in such a way that a displacement force is induced, which counteracts the restoring force of the spring. In this way, the valve slide can be moved out of the control position into a closed position if the pressure of the hydraulic fluid exceeds an appropriate limiting value. If the valve slide is located in the closed position, the inlet of the volumetric flow rate control valve is closed, and so no more hydraulic fluid can be fed to the volumetric flow rate control valve.

In a further embodiment, the hydraulic valve is made available, in a third alternative, as a pressure reduction valve while retaining the design of the valve bush and the recess in the duct plate by varying the valve slide and the duct for feeding hydraulic fluid and by varying the arrangement of the spring, which rests against the duct plate.

In addition, the valve cover and the valve bush can be designed as separate components or as components integrally connected to each other. Correspondingly, the hydraulic part can be designed to be three-piece or four-piece. The hydraulic valve is three-piece if the valve cover and the valve bush are integrally connected to each other and jointly form a component. Component number two is the valve slide in the three-piece design and component number three is the spring. The hydraulic valve is four-piece if the valve cover and the valve bush are designed as separate components. Component number one in the four-piece design is the valve bush, component number two is the valve cover, component number three is the valve slide, and component number four is the spring.

Regardless of whether the hydraulic valve is designed to be three-piece or four-piece, the valve cover and the valve bush are connected, in particular fixedly, to each other if the hydraulic valve is inserted into the recess of the housing part. This connection can be form-locking, force-locking, or integrally joined. The valve bush is designed in such a way that, initially, in a first step, the valve slide and the spring can be inserted into the valve bush. In a subsequent step, the valve bush can be closed, in particular by installing the cover or by deforming the valve bush, in such a way that the valve slide is captured in the valve bush.

In this sense, in one embodiment, the valve cover is designed as a component separate from the valve bush, wherein the valve bush includes a rim, with the aid of which the valve cover is fastened on an end face of the valve bush in a form-locking manner. The valve bush and the valve cover are therefore connected to one another in a form-locking manner via clinching. In addition, if the valve cover is designed as a component separate from the valve bush, the valve cover can be fastened to an end face of the valve bush in a force-locking manner with the aid of an interference fit. Moreover, the valve cover can be designed as a component separate from the valve bush, wherein the valve cover and the valve bush are made of plastic. Within the scope of an integral connection, the valve cover and the valve bush can be bonded to one another or connected to one another with the aid of an inertia weld. In addition, according to a further embodiment, the valve cover can be formed by the valve bush. In this case, the valve bush can include a catch element in the area of an end face that faces away from the cover. The catch element can be produced by bending the valve sleeve radially inward, in particular after insertion of the valve slide and the spring.

In a further embodiment, the housing part forms a stop, which the valve slide can impact in such a way that an annular gap always exists between the valve slide and the valve bush. Due to this annular gap, hydraulic fluid can always act upon a preferably large cross-sectional area of the valve slide, in order to exert a displacement force onto the valve slide in this way.

The spring can exert a restoring force upon the valve slide in such a way that the valve cover and the valve bush are sealed in a longitudinal direction of the hydraulic valve with respect to the intermediate plate. This seal is established, in particular, for the case in which the valve slide of the hydraulic valve is not acted upon by pressure with the aid of hydraulic fluid. During operation, i.e., if hydraulic fluid is directed through the hydraulic valve, this hydraulic valve can exert a force onto the valve slide, and so the valve cover and the valve bush are sealed in a longitudinal direction of the hydraulic valve with respect to the intermediate plate.

According to a second example aspect of the invention, an automatic transmission for a motor vehicle is made available. The automatic transmission includes a hydraulic control unit according to the first example aspect of the invention.

According to a third example aspect of the invention, a motor vehicle is made available, which includes an automatic transmission according to the second example aspect of the invention.

BRIEF DESCRIPTION OF THE DRAWINGS

Exemplary embodiments of the invention are explained in greater detail in the following with reference to the partially diagrammatic drawing, wherein identical or similar elements are provided with the same reference numbers. Wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
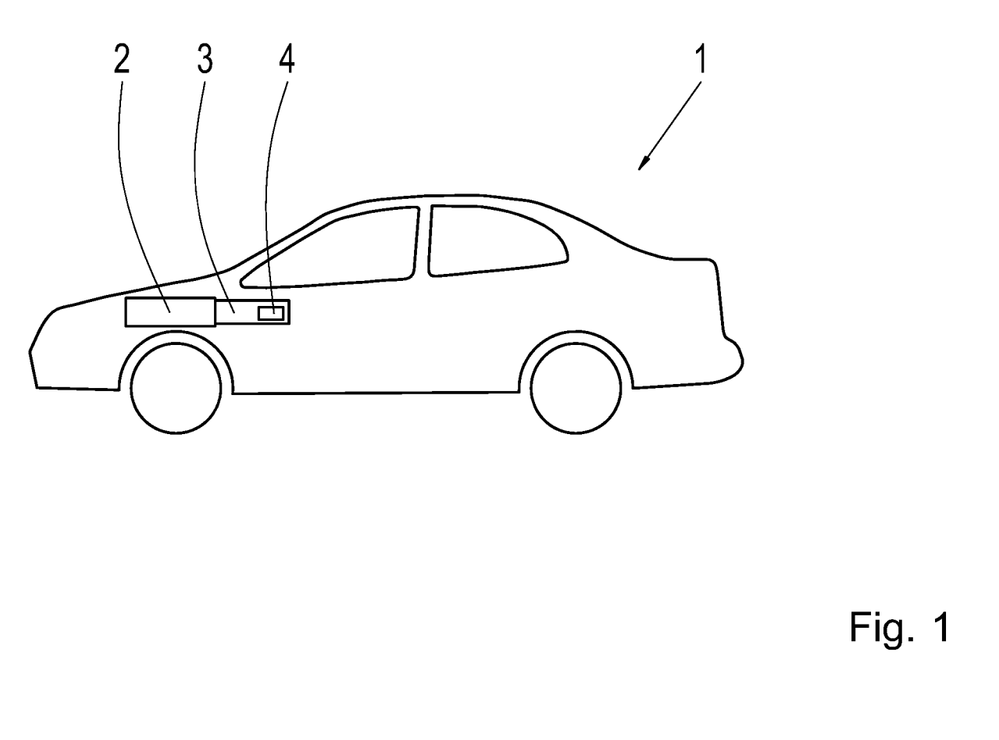
FIG. 1 shows a side view of a motor vehicle including an automatic transmission, which includes a hydraulic control unit.

FIG. 1 shows a motor vehicle 1. This is a passenger car in the example shown. The motor vehicle 1 includes a prime mover 2, for example, an internal combustion engine or an electric motor. The prime mover 2 drives the motor vehicle 1 with the aid of an automatic transmission 3. The automatic transmission 3 includes a hydraulic control unit 4.

Figure 4:
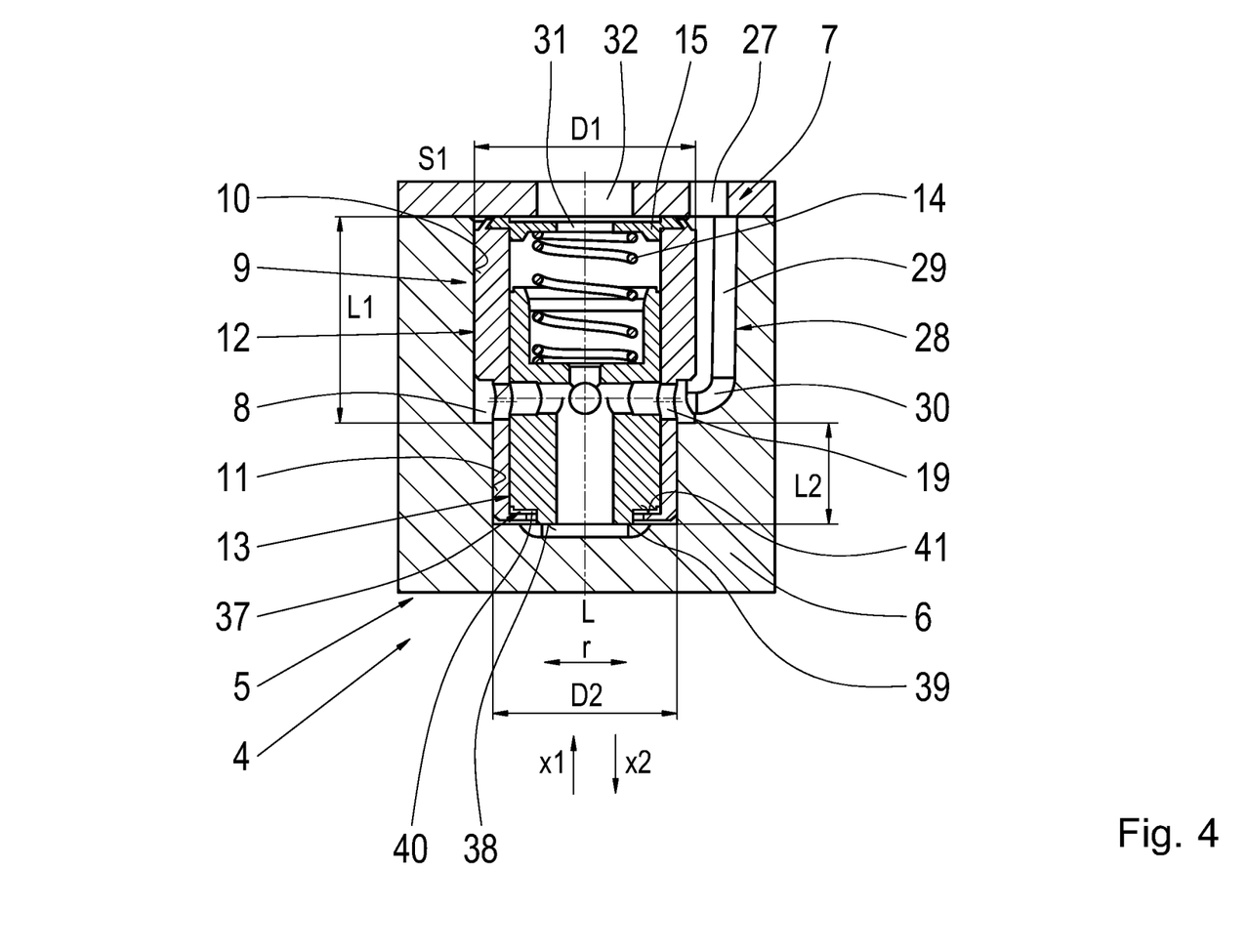
FIG. 4 shows a longitudinal sectional representation of the volumetric flow rate control valve according to FIG. 2, inserted in a portion of a housing of a hydraulic control unit.

FIG. 4 shows a portion of a housing 5 of the hydraulic control unit 4. The housing 5 includes a housing part, specifically a duct plate 6 in the exemplary embodiment shown, and an intermediate plate 7, which can separate the duct plate 6 from a further housing part, for example, from a valve plate. The duct plate 6 includes a recess 8, into which a volumetric flow rate control valve 9 has been inserted or placed, according to FIG. 4.

The recess 8 can be a bore. In the exemplary embodiment shown, the recess 8 is a stepped bore. The stepped bore 8 includes a first bore step 10 having a first bore diameter D1 in a radial direction r of the volumetric flow rate control valve 9 and having a first bore length L1 in an axial direction L of the volumetric flow rate control valve 9. In addition, the stepped bore 8 includes a second bore step 11 having a second bore diameter D2 in the radial direction r of the volumetric flow rate control valve 9 and having a second bore length L2 in the axial direction L of the volumetric flow rate control valve 9. The first bore diameter D1 is greater than the second bore diameter D2. The first bore length L1 is longer than the second bore length L2.

Figure 2:
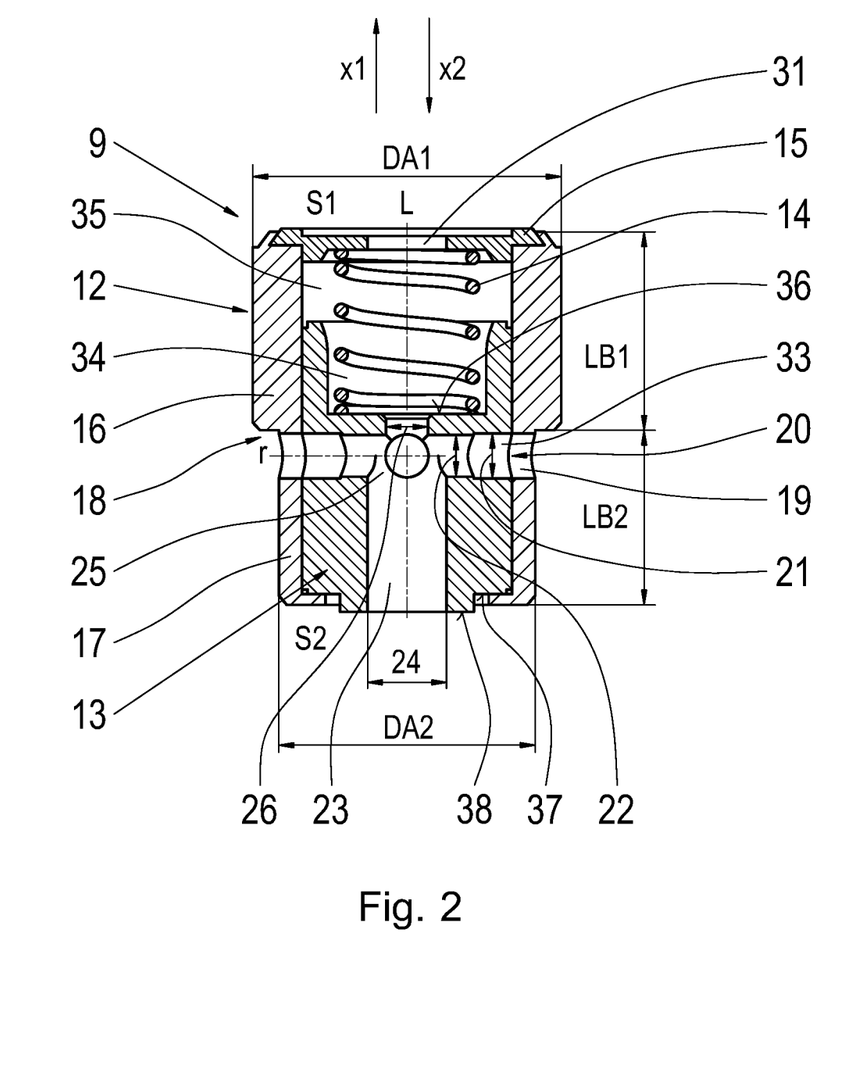
FIG. 2 shows a longitudinal sectional representation of a volumetric flow rate control valve for the hydraulic control unit according to FIG. 1.
Figure 3:
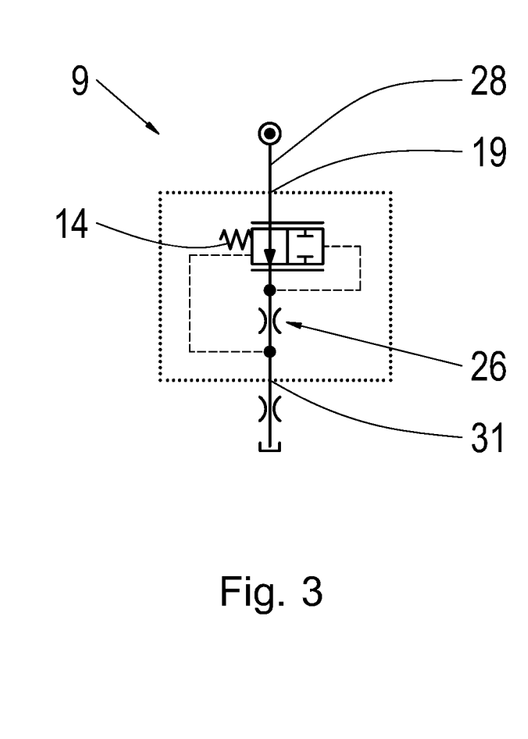
FIG. 3 shows a diagrammatic circuit diagram representation of the volumetric flow rate control valve according to FIG. 2.
Figure 5:
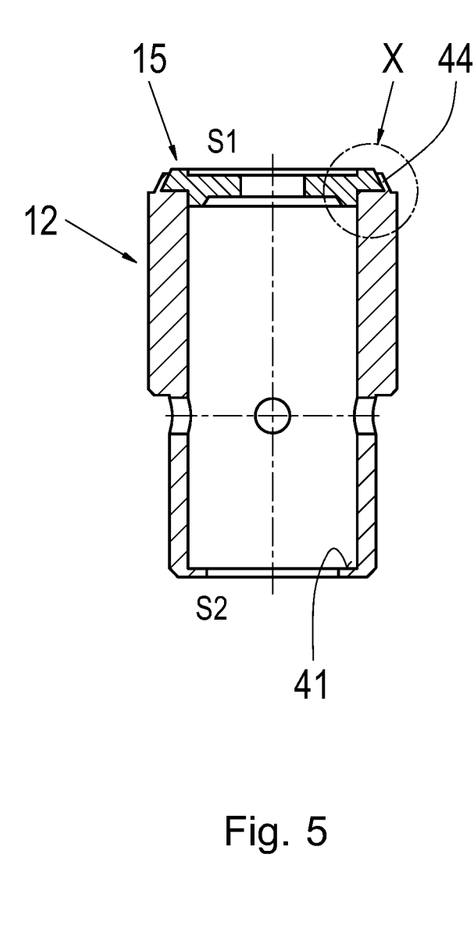
FIG. 5 shows a longitudinal sectional representation of a valve bush of the volumetric flow rate control valve according to FIG. 2, wherein a valve cover of the volumetric flow rate control valve is connected to the valve bush with the aid of a clinching.
Figure 6:
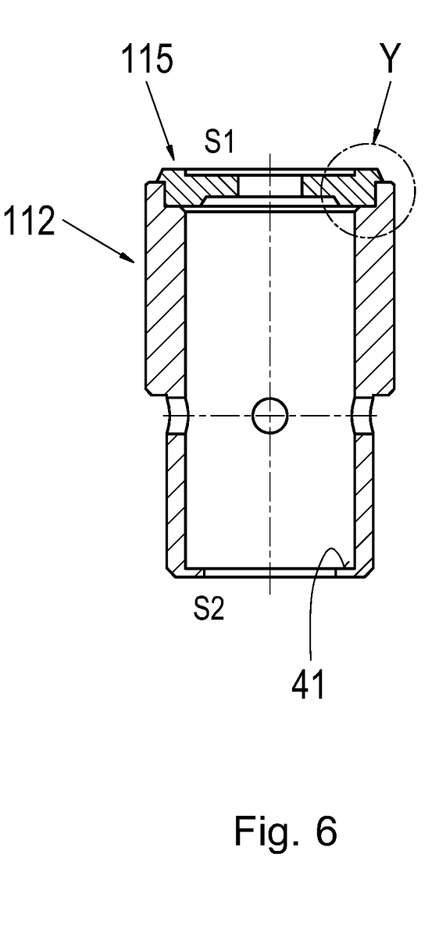
FIG. 6 shows a longitudinal sectional representation of an alternative valve bush for the volumetric flow rate control valve according to FIG. 2, wherein a valve cover of the volumetric flow rate control valve is connected to the valve bush with the aid of an interference fit.
Figure 7:
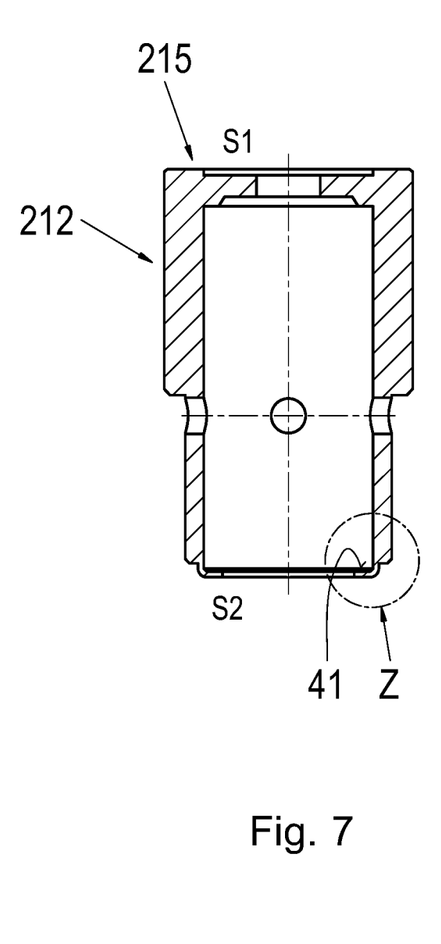
FIG. 7 shows a longitudinal sectional representation of a further valve bush for the volumetric flow rate control valve according to FIG. 2, wherein a valve cover of the volumetric flow rate control valve is integrally connected to the valve bush and is bent on the lower end face.

As is particularly clearly apparent from FIG. 2, the volumetric flow rate control valve 9 includes a valve bush 12 and a valve slide 13. The valve slide 13 is guided in the longitudinal direction L within the valve bush 12. In addition, the volumetric flow rate control valve 9 includes a restoring element in the form of a spring 14 and a valve cover 15. For the sake of clarity, some components of the volumetric flow rate control valve 9 are provided with a reference number only in FIG. 2. FIG. 3 shows the volumetric flow rate control valve 9 in a diagrammatic or schematic manner. The valve bush 12 can be made, for example, of aluminum or plastic. The valve bush 12 can be, for example, a turned part. The valve cover 15 is fixedly connected to the valve bush 12. Examples in this regard are shown in FIGS. 5 through 7, which are explained in greater detail further below. The valve bush 12 and the valve cover 15 can also both be made of plastic and bonded to each other or integrally joined to each other with the aid of friction welding.

The valve slide 13 can be displaced back and forth in opposite axial directions x1 (first direction) and x2 (second direction) within the valve bush 12 along the longitudinal axis L of the volumetric flow rate control valve 9. The outer diameter of the valve slide 13 and the inner diameter of the valve bush 12 are appropriately matched to each other in this regard. The valve slide 13 is preloaded with the aid of the spring 14 in a control position shown in FIG. 4 if the volumetric flow rate control valve 9 is mounted in the duct plate 6. The spring 14 is arranged in the area of a first end face S1 (at the top if the volumetric flow rate control valve 9 has been placed into the duct plate 6) of the volumetric flow rate control valve 9. The first end face S1 faces the intermediate plate 7.

The valve bush 12 includes a first valve collar 16 having a first outer diameter DA1 in the radial direction r of the volumetric flow rate control valve 9 and having a first collar length LB1 in the axial direction L of the volumetric flow rate control valve 9. In addition, the valve bush 12 includes a second valve collar 17 having a second outer diameter DA2 in the radial direction r of the volumetric flow rate control valve 9 and having a second collar length LB2 in the axial direction L of the volumetric flow rate control valve 9.

The first outer diameter DA1 is greater than the second outer diameter DA2. The first collar length LB1 is longer than the second collar length LB2.

The first outer diameter DA1 of the first valve collar 16 of the valve bush 12 is designed to match the first bore diameter D1 of the first bore step 10 of the duct plate 6. In particular, the first outer diameter DA1 can be the same size as or slightly smaller than the first bore diameter D1. In this way, if the intermediate plate 7 is not yet located on the duct plate 6, the first valve collar 16 can be inserted into the first bore step 10 easily and true to size. The ratio of the first bore length L1 of the first bore step 10 with respect to the second bore length L2 of the second bore step 11 is selected in such a way that, initially, only the outer surface of the first valve collar 16 comes into contact with the first bore step 10, whereas the second valve collar 17 initially does not extend into the second bore step 11 and does not yet come into contact with the second bore step 11. In other words, the larger first valve collar 16 has already been guided through the first bore step 10 before the smaller second valve collar 17 is inserted into the second bore step 11. This facilitates the installation of the valve bush 12 within the duct plate 6.

At the point at which the first valve collar 16 transitions into the second valve collar 17, the valve bush forms a step 18. In the area of the step 18, the valve bush 12 includes a radial bore 19, which extends through the second valve collar 17. In the exemplary embodiment according to FIG. 2, the radial bore 19 is a through hole. The radial through hole 19 can be utilized as an inlet of the volumetric flow rate control valve 9 for hydraulic fluid, in particular oil (the radial bore 19 is therefore also referred to in the following as an inlet). The valve slide 13 also includes a radial through hole 20, which, in the exemplary embodiment according to FIG. 2, has the same diameter, in some areas, as the through hole 19 in the second valve collar 17. In the position of the valve slide 13 shown in FIG. 2, the radial through hole 20 of the valve slide 13 aligns with the radial through hole 19 of the second valve collar 13 of the valve bush 12, and so a connection exists between the two radial through holes 19, 20.

The feature "connected" or "connection" is understood to mean, in particular, that the particular interconnected elements are connected to each other in a hydraulically conductive manner, i.e., a hydraulic fluid, in particular oil, can flow from the one element to the other element and, if necessary, vice versa. The feature "disconnected" or "not connected to each other" can be understood to mean, in particular, that the particular elements that are disconnected from each other are not connected to each other in a hydraulically conductive manner, i.e., no hydraulic fluid, in particular oil, can flow from the one element to the other element and, if necessary, vice versa.

The radial through hole 20 of the valve slide 13 is designed as a stepped bore. In the exemplary embodiment according to FIG. 2, the radial through hole 20 connects opposite sections of the outer surface of the valve slide 13 to each other. In the area of an outer step 33, which is located radially farther outward, the through hole 20 has a larger first bore diameter 21. In the area of an inner step 25, which is located radially farther inward, the through hole 20 has a smaller second bore diameter 22.

The valve slide 13 also includes an axial through hole 23. The axial through hole 23 extends coaxially about the longitudinal axis L of the valve slide 13. The axial through hole 23 has a first bore diameter 24 in the area of a second end face S2 (at the bottom if the volumetric flow rate control valve 9 has been placed into the duct plate 6), which is located on a side of the volumetric flow rate control valve 9 opposite the first end face S1. The axial through hole 23 crosses the radial through hole 20 in the inner step 25 of the through hole 20, so that a hydraulic connection exists between the axial through hole 23 and the radial through hole 20.

In the first axial direction x1, an area abuts the inner step 25, in which the axial through hole 23 has a second diameter 26. The second diameter 26 of the axial through hole 23 is smaller than its first diameter 24. The second diameter 22 of the radial through hole 20 and the second diameter 26 of the axial through hole 23 can have the same diameter, as in the exemplary embodiment according to FIG. 2. The area of the axial through hole 23 having the smaller second bore diameter 26 performs the function of an orifice. The pressure of hydraulic fluid that flows through the radial through hole 20 is reduced in the orifice 26 due to the reduced diameter at that point, wherein a constant flow exits the orifice 26.

FIG. 4 shows that the intermediate plate 7 includes a first through hole 27 and that the duct plate 6 includes a feed duct 28. In the assembled state, the first through hole 27 of the intermediate plate 7 is connected to the feed duct 28 of the duct plate 6, and the feed duct 28 of the duct plate 6 is connected to the inlet 19 of the volumetric flow rate control valve 9. Hydraulic fluid can be fed to the inlet 19 of the volumetric flow rate control valve 9 via these line sections 27, 28. The feed duct 28 includes a first duct section 29, which extends in parallel to the longitudinal axis L of the volumetric flow rate control valve 9. A second duct section 30 of the feed duct 28 adjoins the first duct section 29 and extends at a ninety degree (90°) angle, so that the feed duct 28 is connected to the inlet 19 of the volumetric flow rate control valve 9.

The valve cover 15 is arranged on the first end face S1 of the volumetric flow rate control valve 9. The valve cover 15 includes an opening 31, which is utilized as an outlet for hydraulic fluid. The intermediate plate 7 includes a second through hole 32. In the assembled state, the opening 31 of the valve cover 15 of the volumetric flow rate control valve 9 is connected to the second through hole 32 of the intermediate plate 7. The pressure of hydraulic fluid fed to the inlet 19 of the volumetric flow rate control valve 9 via the first through hole 27 and the feed duct 28 can be reduced within the volumetric flow rate control valve 9, as described in the following, so that a constant flow of the hydraulic fluid exits the volumetric flow rate control valve 9 via the outlet 31 and is discharged via the second through hole 32 of the intermediate plate 7. On the opposite, second end face S2 of the volumetric flow rate control valve 9, the axial through hole 23 is closed by the duct plate 6 if the volumetric flow rate control valve 9 has been inserted into the stepped bore 8 (FIG. 4). In this regard, the second bore step 11 is designed as a blind hole. Therefore, no hydraulic fluid exits the volumetric flow rate control valve 9 on the second end face S2.

If the valve slide is located in the control position shown in FIG. 4, hydraulic fluid can enter the radial through hole 20 through the inlet 19 and flow through the radial outer step 33, which has the larger bore diameter 21. The hydraulic fluid can fill the entire radial through hole 20 and the entire axial through hole 23, so that pressure builds up in front of the orifice 26. Thereafter, the pressure of the hydraulic fluid is reduced in the orifice 26 due to the reduced diameter 22 at that point, so that a constant flow exits the orifice 26 in the direction of the first end face S1.

The constant flow of hydraulic fluid, coming out of the orifice 26, flows in the first axial direction x1 into a recess 34 of the valve slide 13. This recess 34 connects the valve slide 13 in the axial direction L to an interior space 35 of the valve bush 12. The recess 34 can be designed, for example, as an axial bore. The interior space 35 of the valve bush 12 is connected to the opening 31 of the valve cover 15 and to the second through hole 32 of the intermediate plate 7. Therefore, the constant flow of hydraulic fluid coming out of the orifice 26 can be discharged from the volumetric flow rate control valve 9 via the recess 34, the interior space 35, the opening 31 in the valve cover 15, and via the second through hole 32 in the intermediate plate 7, and can be made available downstream to a component of the automatic transmission 3, for example, a torus of a torque converter.

The spring 14 is accommodated in the recess 34, which forms a pressure surface 36. A first end of the spring 14 rests against a pressure surface of the valve cover 15. The other end of the spring rests against the pressure surface 36 of the valve slide 13. The pressure surface 36 of the valve slide 13 extends perpendicularly to the longitudinal direction L and extends in the radial direction r. The spring 14 is preloaded. The spring 14 exerts a restoring force onto the pressure surface 36. The restoring force acts in the axial second direction x2 onto the pressure surface 36 of the valve slide 13, so that the valve slide 13 tends to move into the end-stop position represented in FIG. 2.

A displacement force, which acts on the valve slide 13 in the first axial direction x1, can be induced by hydraulic fluid that is fed to the volumetric flow rate control valve 9 via the inlet 19 as described above. The valve slide 13 forms, radially outward, in the area of the second end face S2, an annular surface 37 and, radially farther inward, a stop surface 38. The stop surface 38 is also annular in the exemplary embodiment shown. The annular surface 37 and the stop surface 38 of the valve slide 13 extend perpendicularly to the longitudinal direction L and extend in the radial direction r. The stop surface 38 is arranged at a distance from the annular surface 37 in the axial second direction x2 and forms an end-face termination of the valve slide 13. According to FIG. 4, the duct plate 6 forms, in the area of the second end face S2 of the volumetric flow rate control valve 9, a stop 39 for the stop surface 38 of the valve slide 13 in the axial second direction x2. The spring 14 presses the valve slide 13, via its stop surface 38, against the stop 39 of the duct plate 6. The stop 39 is positioned in such a way that an annular gap 40 is always implemented between the annular surface 37 of the valve slide 13 and an opposite stop surface 41 of the valve bush 12. As a result, the hydraulic fluid can always act upon the complete annular surface 37.

Hydraulic fluid can flow via the inlet 19, via the radial through hole 20, via the axial through hole 23 of the volumetric flow rate control valve 9, and via a passage formed by the duct plate to the annular surface 37 (cf., in particular, FIG. 4) and exert pressure onto the annular surface 37. A displacement force corresponding to this pressure counteracts the restoring force of the spring 14 in the axial first direction x1. If the displacement force increases, the valve slide 13 tends to move in the axial first direction x1, counter to the restoring force of the spring 14. If the pressure of the hydraulic fluid on the annular surface 37 exceeds a limiting value, the valve slide 13 closes the inlet 19, so that no more hydraulic fluid enters the interior of the volumetric flow rate control valve 9. Thereafter, the displacement force will drop again, so that the valve slide 13 is moved, with the aid of the restoring force of the spring 14, in the axial direction x2 again, the valve slide 13 releases the inlet 19 again, and a pressure and/or a displacement force can build up again on the annular surface 37.

The spring 14 rests, in the axial direction L, against the valve slide 13, on the one side and, on the other side, against the valve cover 15. The spring 14 is preloaded and exerts the above-described restoring force onto the valve slide 13, whereby the valve slide, in the position shown in FIG. 4, is pressed against the stop 41. Due to the preload, the spring 14 continues to press the valve cover 15, which is fixedly connected to the valve bush 12, against the intermediate plate 7. In this way, the valve cover 15 is sealed with respect to the intermediate plate 7 with the aid of the spring 14 if the volumetric flow rate control valve 9 has been inserted into the duct plate 6 and is closed in the longitudinal direction L by the intermediate plate 7.

If the hydraulic fluid exerts the above-described displacement force onto the annular surface 37 of the valve slide 13, the valve slide 13 can lift up off the stop 39 of the duct plate 6 counter to the restoring force of the spring 14. In this way, the valve cover 15 is sealed with respect to the intermediate plate 7, during operation, by the pressurized hydraulic fluid if the volumetric flow rate control valve 9 has been inserted into the duct plate 6 and is closed in the longitudinal direction L by the intermediate plate 7.

The volumetric flow rate control valve 9 can be designed to be three-piece (valve bush 212, valve slide 13, and spring 14, wherein the valve cover 215 is integrally connected to the valve bush 212) or four-piece (valve bush 12 or 112, valve slide 13, spring 14, and separate valve cover 15 or 115). FIG. 5 shows the valve bush 12 and the valve cover 15 according to FIG. 2 for a four-piece design of the volumetric flow rate control valve 9. FIG. 6 shows an alternative valve bush 112 and an alternative valve cover 115 for a four-piece design of the volumetric flow rate control valve 9. The valve bush 12 or 112 is designed as a turned part in these exemplary embodiments, wherein the end face S2 represented at the bottom in FIGS. 5 and 6 forms the above-described stop surface 41 in each case. The end faces S1 of the valve bush 12 or 112 represented at the top in FIGS. 5 and 6 each include an opening, which is partially closed by the valve cover 15 or 115, respectively. Before the valve cover 15 or 115 is mounted onto the valve bush 12 or 112, respectively, the valve slide 13 can be inserted through the opening of the valve bush 12 or 112, respectively, from the first end face S1. Thereafter, the valve cover 15 or 115 is installed, so that the volumetric flow rate control valve 9 can be inserted, preassembled, into the stepped bore 8.

The detail X in FIG. 5 shows that the valve cover 15 can be clinched to the valve bush 12, wherein a rim 44 is formed on the end face S1 of the valve bush 12. FIG. 6 shows an alternative embodiment of a valve bush 112 and of a valve cover 115 for a four-piece design of the volumetric flow rate control valve 9. The detail Y in FIG. 6 shows that the valve bush 112 and the valve cover 115 can be connected to each other in a friction-locking manner with the aid of an interference fit or press fit. FIG. 7 shows a further alternative embodiment of a valve bush 212 and of a valve cover 215 for a three-piece design of the volumetric flow rate control valve 9. The detail Z in FIG. 7 shows that an enclosure of the inner parts (valve slide 13 and spring 14) can also take place with the aid of a deformation on the second end face S2, wherein the valve cover 215 is integrally connected to the valve bush 212 on the first end face S1. The valve slide 12 can be initially inserted into the valve bush 212 from the second end face S2. Thereafter, the valve bush 212 can be deformed radially inward, as shown with the aid of detail Z (capture element) of FIG. 7, so that the valve slide 13 is captured in the valve bush 212. Thereafter, the volumetric flow rate control valve 9 can be inserted, preassembled, into the stepped bore 8.

Figure 8:
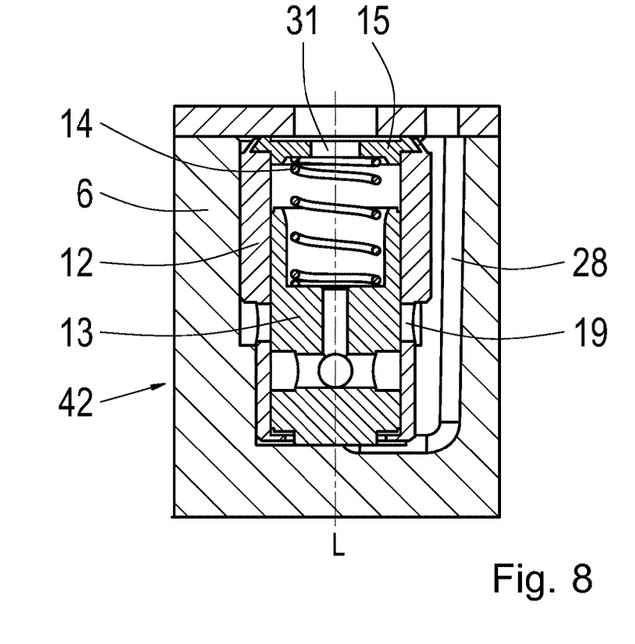
FIG. 8 shows a longitudinal sectional representation of a pressure control valve for the hydraulic control unit according to FIG. 1.
Figure 9:
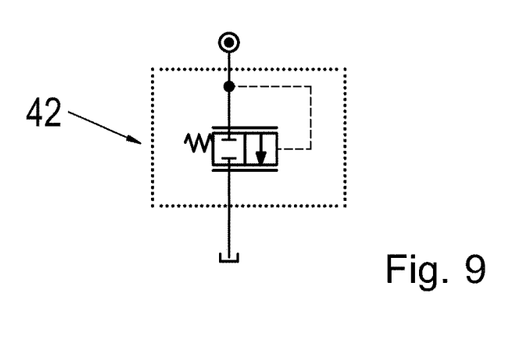
FIG. 9 shows a diagrammatic circuit diagram representation of the pressure control valve according to FIG. 8.

FIG. 8 shows the valve bush 12, the spring 14, and the valve cover 15 according to FIG. 4, which have been inserted into the same stepped bore 8 of the duct plate 6 according to FIG. 4. The valve slide 13 and the feed duct 28 in the duct plate 6 are different, however. These are designed in such a way that a pressure control valve 42 according to FIG. 9 is created.

Figure 10:
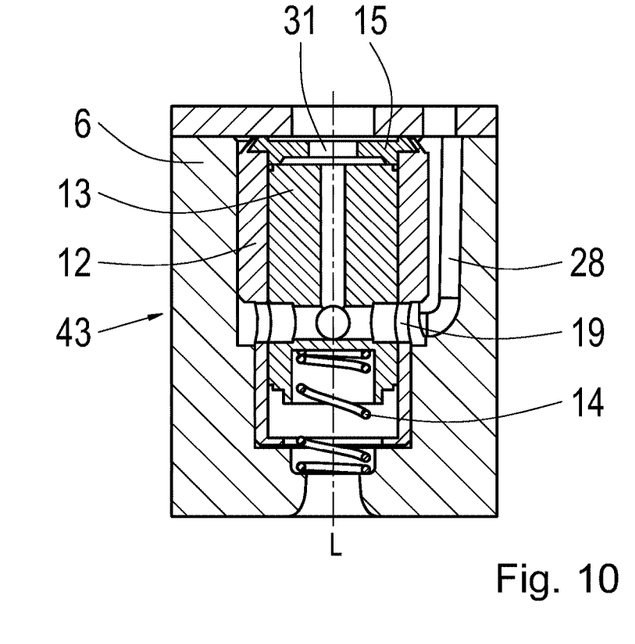
FIG. 10 shows a longitudinal sectional representation of a pressure reduction valve for the hydraulic control unit according to FIG. 1.
Figure 11:
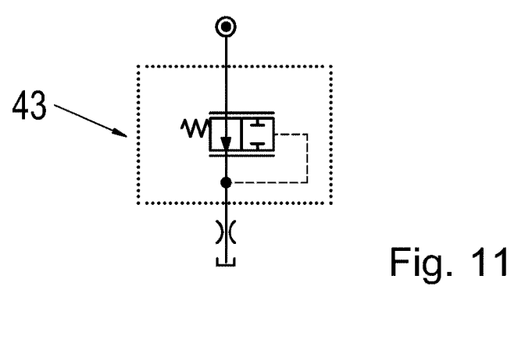
FIG. 11 shows a diagrammatic circuit diagram representation of the pressure reduction valve according to FIG. 10.

FIG. 10 shows the valve bush 12 and the valve cover 15 according to FIG. 4, which have been inserted into the same stepped bore 8 of the duct plate 6 according to FIG. 4. The valve slide 13, the spring 14, which rests against the duct plate 6 instead of against the valve cover 15, and the feed duct 28 in the duct plate 6 are different, however. The aforementioned elements 6, 13, 14, and 28 are designed in such a way that a pressure reduction valve 43 according to FIG. 11 is created.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS

D1 first bore diameter
D2 second bore diameter
DA1 first outer diameter
DA2 second outer diameter
L1 first bore length
L2 second bore length
LB1 first collar length
LB2 second collar length
L axial direction of volumetric flow rate control valve
r radial direction of volumetric flow rate control valve
S1 first end face
S2 second end face
x1 first axial direction
x2 second axial direction
X clinching
Y interference fit
Z capture element
1 motor vehicle
2 prime mover
3 automatic transmission
4 hydraulic control unit
5 housing
6 housing part
7 intermediate plate
8 stepped bore
9 volumetric flow rate control valve
10 first bore step
11 second bore step
12 valve bush
13 valve slide
14 spring
15 valve cover
16 first valve collar
17 second valve collar
18 step
19 radial through hole of second valve collar
20 radial through hole of valve slide
21 smaller bore diameter of radial through hole
22 larger bore diameter of radial through hole
23 axial through hole of valve slide
24 larger bore diameter of axial through hole
25 inner step of radial through hole
26 smaller bore diameter of axial through hole
27 first through hole of intermediate plate
28 feed duct
29 first duct section of feed duct
30 second duct section of feed duct
31 opening in valve cover
32 second through hole of intermediate plate
33 outer step of radial through hole
34 recess of valve slide
35 interior space in valve bush
36 pressure surface
37 annular surface
38 stop surface
39 stop
40 annular gap
41 stop surface of the valve bush
42 pressure control valve
43 pressure reduction valve
44 rim
112 valve bush
115 valve cover
212 valve bush
215 valve cover

The invention claimed is:

1. A hydraulic control unit (4) for an automatic transmission (3) of a motor vehicle (1), comprising:
 a valve bush (12, 112, 212);
 a valve cover (15, 115, 215) partially closing the valve bush (12, 112, 212) on an end face (S1);
 a valve slide (13) guided within the valve bush (12, 112, 212) in a longitudinal direction (L);
 a housing part (6) comprising a recess (8) matching an external contour of the valve bush (12, 112, 212);
 an intermediate plate (7) partially covering the valve cover (15, 115, 215) and forming a counter support for the valve cover (15, 115, 215); and
 a spring (14) arranged within the valve bush (12, 112, 212) for preloading the valve slide (13) in a starting position,
 wherein the valve bush (12, 112, 212), the valve cover (15, 115, 215), the valve slide (13), and the spring (14) are inserted into the recess (8) of the housing part (6) and form a hydraulic valve (9, 42, 43),
 wherein the valve bush (12, 112, 212) forms an inlet (19) for hydraulic fluid into the hydraulic valve (9, 42, 43),
 wherein the valve cover (15, 115, 215) forms an outlet (31) for hydraulic fluid out of the hydraulic valve (9, 42, 43),
 wherein the housing part (6) forms a duct (28) for feeding hydraulic fluid to the inlet (19) in the valve bush (12), and
 wherein the intermediate plate (7) forms a duct (32) for discharging hydraulic fluid out of the outlet (31) of the valve cover (15).

2. The hydraulic control unit (4) of claim 1, wherein:
the recess (8) is a stepped bore comprising two bore steps (10, 11);
each of the two bore steps (10, 11) is designed to match a respective one of two valve collars (16, 17) of the valve bush (12, 112, 212); and
bore lengths (L1, L2) of the two bore steps (10, 11) are matched to each other such that the valve bush (12, 112, 212) is insertable into the stepped bore (8) so that, initially, only the valve collar (16) with a greater outer diameter (DA1) comes into contact with the respective stepped bore (10).

3. The hydraulic control unit (4) of claim 1, wherein the hydraulic valve (9, 42) is either a volumetric flow rate control valve (9) or a pressure control valve (42).

4. The hydraulic control unit (4) of claim 1, wherein the hydraulic valve (43) is a pressure reduction valve (43).

5. The hydraulic control unit (4) of claim 1, wherein:
the valve cover (15) is formed as a separate component from the valve bush (12); and
the valve bush (12) comprises a rim (44), the valve cover (15) fastened to an end face (S1) of the valve bush (12) in a form-locking manner with the rim (44).

6. The hydraulic control unit (4) of claim 1, wherein:
the valve cover (115) is formed as a separate component from the valve bush (112); and
the valve cover (115) is fastened to an end face (S1) of the valve bush (112) in a force-locking manner by an interference fit.

7. The hydraulic control unit (4) of claim 1, wherein:
the valve cover (15, 115) is formed as a separate component from the valve bush (12, 112);
the valve cover (15, 115) and the valve bush (12, 112) are made of plastic; and
the valve cover (15, 115) and the valve bush (12, 112) are bonded to each other or connected to each other by an inertia weld.

8. The hydraulic control unit (4) of claim 1, wherein the valve cover (215) is integrally formed with the valve bush (212).

9. The hydraulic control unit (4) of claim 1, wherein the housing part (6) forms a stop (39), and the valve slide (13) impacts the stop (39) such that an annular gap (40) always exists between the valve slide (13) and the valve bush (12, 112, 212).

10. The hydraulic control unit (4) of claim 1, wherein the spring (14) exerts a restoring force onto the valve slide (13) such that the valve cover (15, 115, 215) and the valve bush (12, 112, 212) are sealed with respect to the intermediate plate (7) in a longitudinal direction (L) of the hydraulic valve (9, 42, 43).

11. The hydraulic control unit (4) of claim 1, wherein hydraulic fluid fed to the hydraulic valve (9, 42, 43) exerts a force onto the valve slide (13) such that the valve cover (15, 115, 215) and the valve bush (12, 112, 212) are sealed with respect to the intermediate plate (7) in a longitudinal direction (L) of the hydraulic valve (9, 42, 43).

12. The hydraulic control unit (4) of claim 1, wherein the intermediate plate (7) is positioned on the housing part (6) such that the intermediate plate (7) extends over the recess (8).

13. The hydraulic control unit (4) of claim 1, wherein the spring (14) is compressed against the valve slide (13) within the valve bush (12, 112, 212).

14. An automatic transmission (3) for a motor vehicle (1), comprising the hydraulic control unit (4) of claim 1.

15. A motor vehicle (1), comprising the automatic transmission (3) of claim 14.

* * * * *